No. 689,849. Patented Dec. 31, 1901.
F. H. BROWN.
APPARATUS FOR DETECTING AND LOCATING METALLIC ORES, MINERALS, &c.
(Application filed Jan. 24, 1900.)
(No Model.) 2 Sheets—Sheet 1.
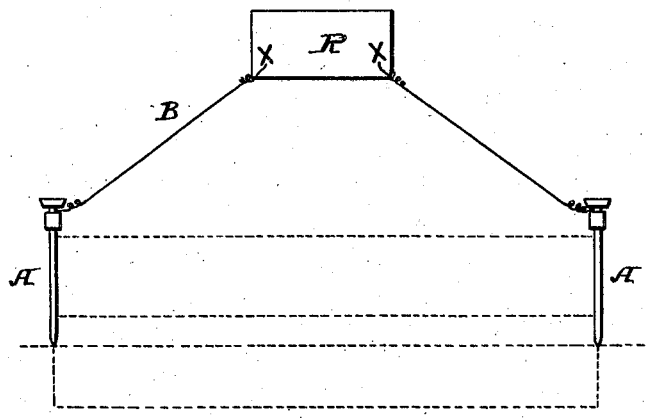
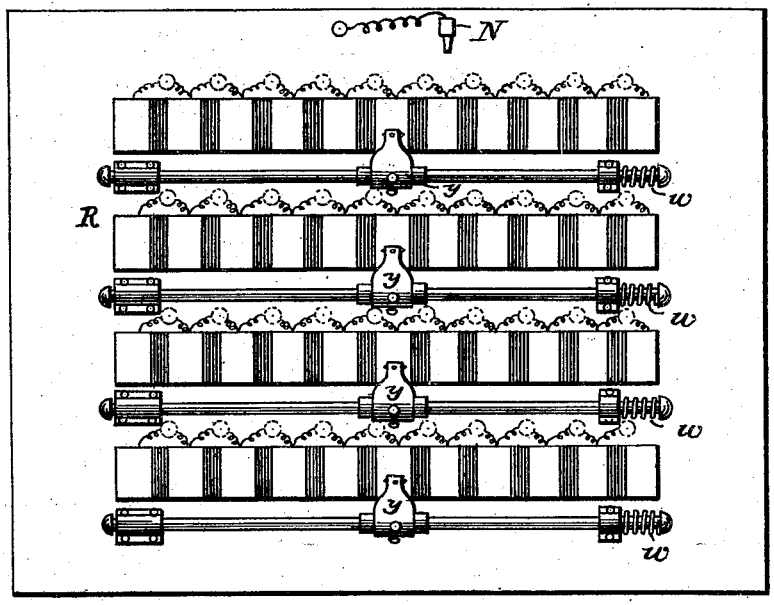
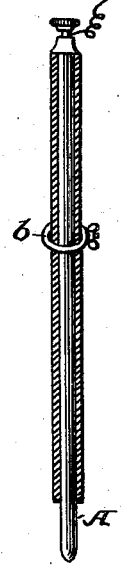
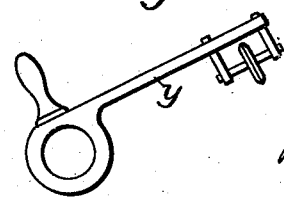

No. 689,849. Patented Dec. 31, 1901.
F. H. BROWN.
APPARATUS FOR DETECTING AND LOCATING METALLIC ORES, MINERALS, &c.
(Application filed Jan. 24, 1900.)
(No Model.) 2 Sheets—Sheet 2.

Witnesses
Inventor
Fred H. Brown
By Brown & Darby
Attorneys

UNITED STATES PATENT OFFICE.

FRED H. BROWN, OF CHICAGO, ILLINOIS.

APPARATUS FOR DETECTING AND LOCATING METALLIC ORES, MINERALS, &c.

SPECIFICATION forming part of Letters Patent No. 689,849, dated December 31, 1901.

Application filed January 24, 1900. Serial No. 2,562. (No model.)

*To all whom it may concern:*

Be it known that I, FRED H. BROWN, a citizen of the United States, residing at Chicago, in the county of Cook and State of Illinois, have invented certain new and useful Improvements in Apparatus for Detecting and Locating Metallic Ores, Minerals, and the Like, of which the following is a specification.

This invention relates to apparatus for detecting and locating metallic ores, minerals, and the like.

The object of the invention is to provide an apparatus of simple construction and arrangement for detecting and locating ores, minerals, or buried treasure.

The invention consists substantially in the construction, combination, location, and arrangement of parts, all as will be more fully hereinafter set forth, as shown in the accompanying drawings, and finally set forth in the appended claims.

Figure 3:
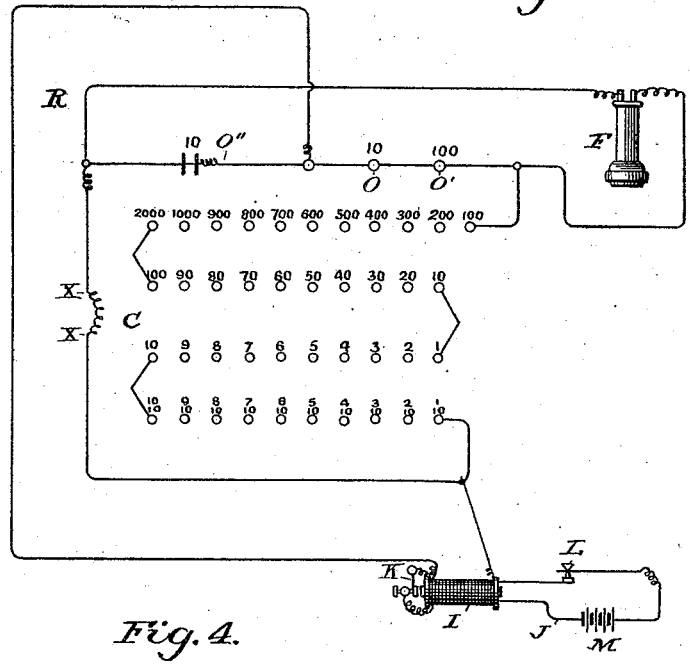
Figure 4:
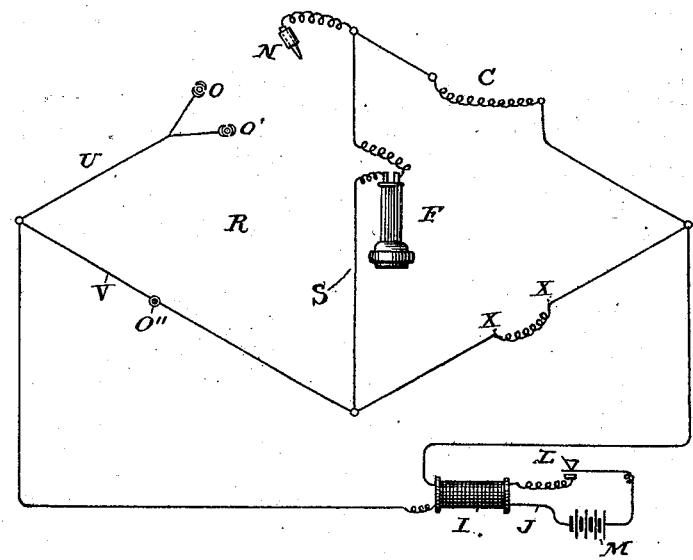

Referring to the accompanying drawings, and to the various views and reference-signs appearing thereon, Figure 1 is a view in diagram of an apparatus embodying my invention. Fig. 2 is a top view of a rheostat or resistance-box employed in connection with my invention. Fig. 3 is a diagram of the circuits of the apparatus. Fig. 4 is a similar view. Fig. 5 is a detached detail view of a form of movable contact employed in connection with my invention. Fig. 6 is a similar view of a metallic terminal designed to be inserted in the earth. Fig. 7 is a view illustrating a modified form of terminal.

In the drawings reference-signs A A designate metallic rods of suitable conducting material, such as copper, and adapted to be inserted in the earth. These rods form terminals of a circuit B and are connected, as at X X, in circuit, which includes a Wheatstone bridge (indicated diagrammatically at R, Fig. 1) and the secondary of an induction-coil I. The primary J of said induction-coil includes a battery or other source of current (indicated at M) and a suitable circuit-breaker, such as a key L or a vibrator K. (See Fig. 3.) Included in one branch of the Wheatstone bridge is a rheostat or resistance-box. (Indicated diagrammatically at C, Fig. 4, and more in detail in Figs. 2 and 3.) The branch or leg U of the Wheatstone bridge may include the sockets O O' and plug N in the usual manner, and the branch V may include the fixed resistance O'', and the bridge portion S may include a suitable signal or indicating device, such as a telephone-receiver F.

In accordance with the well-known principles of the Wheatstone bridge when the resistance between the two terminals A A equals the resistance C, which is in the circuit, the resistances of the other two branches being equal, then no current traverses the bridge portion S, and hence no sound or other signal will be produced therein. If, however, the relative resistance of the rheostat and of the circuit between the terminals A A is varied, then the electrical equilibrium of the bridge is disturbed, and a signal will be given in the branch S of the bridge, and by removing or inserting resistance in the rheostat, as the case may be, until equilibrium is again established, then the extent of such variation may be measured and determined. This principle is taken advantage of in the practical operation of my invention for detecting or locating ores, minerals, or the like in the following manner: The terminals A A are inserted in the earth a definite predetermined distance apart, and a reading of the resistance-box is made, showing the resistance of the earth or portion thereof included in the distance or space which is known between the two terminals. This operation is repeated again and again at various points in the same vicinity, a reading of the resistance being noted in each case. Now if ores or minerals are present in the vicinity being tested then by reason of such presence the resistance of the earth at the particular point where the measurement is taken will be less than it would be if no ore or mineral were present, by reason of the well-known fact that a current will seek the path of least resistance, and hence by comparing the measurements taken, as above described, the location as well as the presence of the ore may be detected and determined, and when the location of the ore or mineral is once determined in the manner described its depth below the surface of the earth may be determined by varying the distance between the terminals A A and comparing the corresponding readings of the rheostat. For instance, if the ore is, say, fifty feet below the surface of the earth and the terminals are spaced one hundred feet or less apart then the presence of the ore will not be detected; but if the terminals are spaced two hundred feet apart then the presence of the ore would be detected, and by repeated tests at varying distances apart of the terminals the exact depth would be determined.

In Fig. 5 is shown a form of movable contact $g$, employed in connection with the resistance-box or rheostat. These contacts are mounted to slide on rods and over the contacts of the resistance-box in the usual manner, whereby the readings of the box may be effected readily and rapidly. A spring $w$ may be employed to maintain the contact $g$ constantly pressed against the surface of the rheostat-contacts.

The terminals A A carry collars $a$, having suitable binding-posts whereby the circuit-wires may be connected thereto, and, if desired, collars $b$ may be mounted thereon for limiting the depth to which the rods are driven into the earth.

It is desirable to concentrate the contact of the rods with the earth. Therefore, if desired, the terminal rods A A may be inclosed to a point adjacent to the ends thereof in an insulating-sheathing, as shown in Fig. 7, leaving only the end of such rod exposed, thus concentrating, so to speak, the conductivity of the rod at a single point.

It will be observed that the terminals A A are included in the circuit of the secondary of an induction-coil, and hence I thereby avoid the objections and defects of electrolysis which takes place at the terminals in the case where a battery or other direct current is employed in the circuit of the terminals. I also avoid the effects of variations in the earth-currents which would otherwise render the readings of the rheostat uncertain and unreliable.

It is obvious that many variations and changes in the details of construction and arrangement would readily suggest themselves to persons skilled in the art and still fall within the spirit and scope of my invention. I do not desire, therefore, to be limited or restricted to the exact construction and arrangement shown and described; but, Having now set forth the object and nature of my invention and a form of apparatus embodying the principles thereof, what I claim is—

1. In an apparatus for locating ores or metals in the earth, the combination with circuit-terminals independent of and freely movable with respect to each other and adapted to be brought into contact with the earth at various and widely-separated points to close electric circuits which include the earth between such terminals, and means for measuring the resistances of the earth portions of said circuits, as and for the purpose set forth.

2. In an apparatus for locating ores or metals in the earth, the combination with an electric circuit, terminals for such circuit, said terminals being independent of and freely movable with respect to each other and adapted to be brought into contact with the earth at various widely-separated points and means arranged in said circuit for measuring the resistances of the earth portion of said circuits as and for the purpose set forth.

3. In an apparatus for locating ores or metals in the earth, the combination of an electric circuit including independent freely-movable terminals adapted to be brought into contact with the earth at various and widely-separated points, to complete said circuit through the earth, a source of alternating current for said circuit, and means for measuring the resistance of the earth portions of the circuits so established, as and for the purpose set forth.

4. In an apparatus for locating ores or metals in the earth, the combination with an induction-coil, of terminals for the secondary of such coil, said terminals being independent of and freely movable with respect to each other and adapted to be inserted in the earth at various and widely-separated points, an indicator also arranged in said secondary circuit, and an exciting-circuit for the primary of said coil, whereby the resistance of the earth portion of the circuit between the terminals may be measured, as and for the purpose set forth.

5. In an apparatus for locating ores or metals in the earth, the combination with an induction-coil, of terminals for the secondary of such coil, said terminals being independent of and freely movable with respect to each other and adapted to be inserted in the earth at various and widely-separated points, means for measuring the resistance of the earth between said terminals, an exciting-circuit for the primary of said induction-coil, and a circuit-interrupter for said primary circuit, as and for the purpose set forth.

6. In an apparatus for locating ores or metals in the earth, the combination with an induction-coil, of terminals for the secondary of such coil, said terminals being independent of and freely movable with respect to each other and adapted to be inserted in the earth at various and widely-separated points, a resistance-box arranged in said secondary circuit for measuring the resistance thereof, an exciting-circuit for the primary of said induction-coil, and means for interrupting said primary circuit, as and for the purpose set forth.

7. In an apparatus for locating ores or metals in the earth, the combination with an induction-coil, of terminals for the secondary of such coil, said terminals being independent of and freely movable with respect to each other and adapted to be inserted in the earth at various and widely-separated points, a Wheatstone bridge also arranged in said secondary circuit whereby the resistance of said circuit may be measured, an exciting-circuit for the primary of said coil, and means for interrupting said primary circuit, as and for the purpose set forth.

In witness whereof I have hereunto set my hand, this 23d day of January, 1900, in the presence of the subscribing witnesses.

FRED H. BROWN.

Witnesses:
J. A. WATSON,
S. E. DARBY.